United States Patent [19]
Uetsuki et al.

[11] Patent Number: 4,821,975
[45] Date of Patent: Apr. 18, 1989

[54] BACKLASH PREVENTION ADJUSTMENT MECHANISM FOR A FISHING REEL

[75] Inventors: Haruo Uetsuki; Takehiro Kobayashi; Kounoshin Makino, all of Hiroshima, Japan

[73] Assignee: Ryobi Ltd., Hiroshima, Japan

[21] Appl. No.: 153,925

[22] Filed: Feb. 9, 1988

[30] Foreign Application Priority Data

Feb. 11, 1987 [JP] Japan .............................. 62-19299[U]
Mar. 4, 1987 [JP] Japan .............................. 62-32445/[U]

[51] Int. Cl.⁴ ............................................. A01K 89/02
[52] U.S. Cl. .............................. 242/84.52 B; 74/435; 74/625; 188/267
[58] Field of Search .................. 242/84.1 A, 84.52 R, 242/84.52 A, 84.52 B; 43/21; 188/105, 106 P, 164, 165, 267; 74/435, 625

[56] References Cited

U.S. PATENT DOCUMENTS 2,204,241 6/1940 Young ................................... 74/435
4,541,294 9/1985 Byers ................................ 74/625 X
4,674,699 6/1987 Fukushima ................... 242/84.52 B

FOREIGN PATENT DOCUMENTS 59568 4/1982 Japan .............................. 242/84.52 B
1229965 8/1983 Japan .............................. 242/84.52 B
59-178070 11/1984 Japan .............................. 242/84.52 B
62-1575 1/1987 Japan .............................. 242/84.52 B Primary Examiner—Joseph J. Hail, III
Attorney, Agent, or Firm—Finnegan, Henderson, Farabow, Garrett, & Dunner

[57] ABSTRACT

A backlash prevention adjustment mechanism for a backlash prevention device includes a first magnet, a second magnet, and a nonmagnetic electroconductive member provided therebetween, being rotatable with a spool shaft, and having an eddy current induced therein by the first and second magnet to provide a braking force for the spool to prevent backlash. A motor is provided to move the first magnet relative to the second magnet to change the level of the eddy current. A lever is also provided to manually move the first magnet with respect to the second magnet. In another aspect, a shielding yoke is provided on the first magnet and is movable therewith to position a slit in the yoke proximate a first magnetism sensor or a second magnetism sensor to detect positions thereof corresponding to maximum and minimum levels of the eddy current.

3 Claims, 4 Drawing Sheets

BACKLASH PREVENTION ADJUSTMENT MECHANISM FOR A FISHING REEL

FIELD OF THE INVENTION

The present invention relates to a backlash prevention adjustment mechanism for a backlash prevention device for a fishing reel having a spool shaft supported at both its ends and in which one of the magnets for braking the rotation of the spool by inducing an eddy current in a nonmagnetic electroconductive member rotated together with the spool may be turned both by a motor and manually to prevent the backlash of a fishline.

As another feature of the present invention, a magnet ring turn limit position detecting mechanism for a backlash prevention device is provided in which a magnetic ring is provided both inside and outside a nonmagnetic electroconductive member that is rotated in conjunction with the rotation of a spool. One magnetic ring is turned by a motor to control a braking force on the spool.

BACKGROUND OF THE INVENTION

In a conventional backlash prevention device disclosed in Japanese Utility Model Application (OPI) No. 178070/84 (the term "OPI" as used herein means an "unexamined published application"), the rotation of a spool is automatically braked when a set time has elapsed since the start of the rotation of the spool. It is difficult, however, to precisely set the time that it will take for a fishhook, a fishline, and so forth to reach an aimed point after the start of the rotation of the spool. Since the cast length of the fishline differs from time to time, the rotation of the spool is not braked if the fishhook, the fishline, and so forth reach the aimed point within a period shorter than the set time. For that reason, there is a problem that the fishline is likely to backlash.

Another backlash prevention device for solving the above-mentioned problem was disclosed in Japanese Utility Model Application (OPI) No. 1575/87. In the device, the number of pulses from a reference clock signal generation circuit to detect the rotation of the spool, and the speed and acceleration of the rotation of the spool are calculated from the number of pulses counted. The rotation of the spool is braked when the calculated speed and acceleration are equal to set values or are negative. The rotation of the spool is not braked when the calculated speed and acceleration are zero. Consequently, backlash is prevented regardless of the cast length of the fishline or the faulty casting thereof.

In still another backlash prevention device for solving the above-mentioned problem, the speed and acceleration of the rotation of a spool are calculated by a CPU in terms of a signal from a timer circuit and a signal from a sensor for detecting the rotation of the spool and are compared with reference data. The rotation of the spool is braked by causing an eddy current in a nonmagnetic electromagnetic member when the differences between the calculated speed and acceleration and the specified values are not less than prescribed values. The rotation of the spool is not braked when the differences are less than the prescribed values. As for the device, the rotation of the spool can be braked as occasion demands, to shorten the time of the braking.

Since a magnet must be rotated by a motor in each of the above-mentioned conventional backlash prevention devices so as to automatically prevent the backlash of the fishline, they have the disadvantage that the backlash cannot be prevented when a power supply (such as a battery) for the motor is not effectively usable.

In yet another backlash prevention device, a motor is rotated in accordance with a signal to turn a magnet ring so that the rotation of the spool is braked when the calculated speed and acceleration are equal to set values or are negative and the rotation of the spool is not braked when the calculated speed and acceleration are zero. Since the rotation of the motor needs to be regulated to stop the magnet ring in positions accurately corresponding to the maximum and minimum levels of the braking force on the spool, respectively, the motor is complicated and expensive. If conventional components such as a limit switch and an encoder are used as means for controlling the quantity f rotation of an ordinary motor for such a backlash prevention device, a larger installation space is needed for the device which prevents the reduction in the size and weight of a fishing reel and increases the cost of production thereof. This is still another problem.

OBJECTS AND SUMMARY OF THE INVENTION

An object of the present invention is a backlash prevention adjustment mechanism to prevent fishline backlash during casts of varying length.

Another object of the present invention is a backlash prevention adjustment mechanism that includes an electrical backlash prevention mechanism and a backup mechanical backlash prevention mechanism in case of failure of the electrical mechanism.

Still another object of the present invention is a backlash prevention adjustment mechanism that is of simple and compact construction and may be manufactured at a low cost.

These and other objects are accomplished by a backlash prevention adjustment mechanism for a backlash prevention device comprising a rotatable spool shaft, a spool mounted on the spool shaft, first magnetic means, second magnetic means, a nonmagnetic electroconductive member provided between the first magnetic means and the second magnetic means and being rotatable with the rotatable spool shaft, the first magnetic means and the second magnetic means for inducing an eddy current in the nonmagnetic electroconductive member to brake the rotation of the spool to prevent backlash of a fishline wound on the spool, a first gear mechanism for moving the first magnet means with respect to the second magnet means to change the level of eddy current induced in the nonmagnetic electroconductive member, a motor, a motor shaft gear rotated by the motor and engaged with the first gear mechanism to rotate the first gear mechanism to move the first magnetic means, and a manual eddy current adjustment means rotatable to a first position disengaged from the motor shaft gear and second position engaged with the motor shaft gear to rotate the first gear mechanism to move the first magnet means.

The above and other objects are further accomplished by a backlash prevention adjustment mechanism for a backlash prevention device comprising a rotatable spool shaft having a spool mounted thereon, a first magnetic means, a second magnetic means, a nonmagnetic electroconductive member provided between the first magnetic means and the second magnetic means and being rotatable with the rotatable spool shaft, the first magnetic means and the second magnetic means for inducing an eddy current in the nonmagnetic electroconductive member to brake the rotation of the spool to prevent backlash of a fishline wound on the spool, a motor for rotating the first magnetic means with respect to the second magnetic means between a first position corresponding to maximum level of the eddy current and a second position corresponding to a minimum level of the eddy current, and means for sensing the position of the first magnetic means with respect to the second magnetic means to stop the rotation of the first magnetic means by the motor responsive to the first magnetic means being in one of the first position and the second position.

BRIEF DESCRIPTION OF THE DRAWINGS

The manner in which the above objects and other objects, features and advantages of the present invention are attained will be fully apparent from the following detailed description when considered in view of the drawings, wherein:

As shown in FIGS. 1 and 2, a spool 1 is supported by the spool shaft 2 to the body 3 of the fishing reel so that the spool can be rotated in conjunction with the rotation of a handle (not shown in the drawings). A motor 5 is secured between the right and left side plates 4 and 4' of the reel body 3. A motor shaft gear 6 is secured to the shaft 5a of the motor 5.

Figure 1:
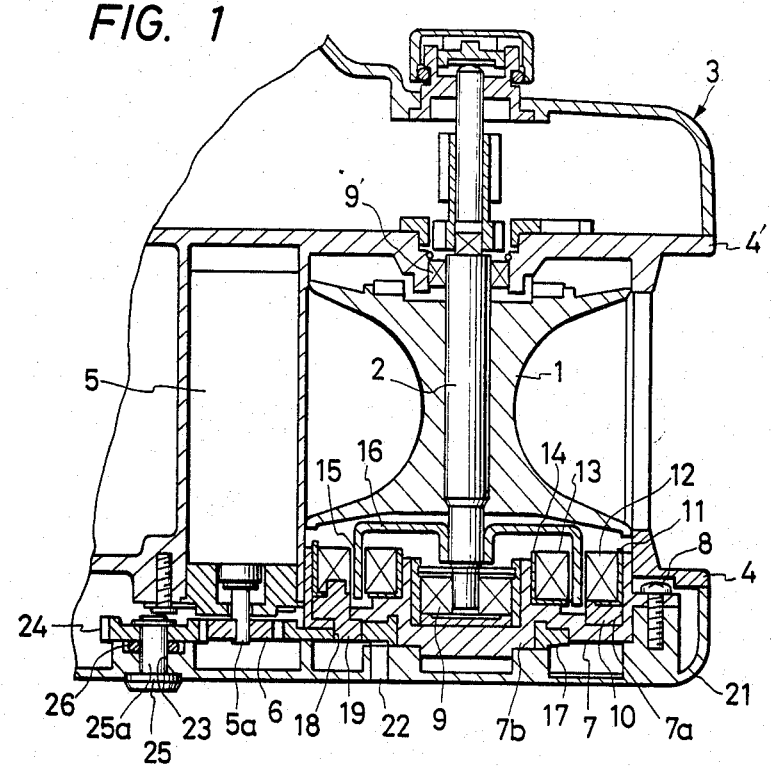
FIG. 1 is a longitudinal sectional view of an embodiment of the backlash prevention adjustment mechanism of the present invention.

A magnet holder 7 is secured to one side cover 21 of the reel body 3 near the motor shaft gear 6 by screws 8 coaxially with the spool shaft 2. The spool shaft 2 is supported by bearings 9 and 9' to the magnet holder 7 and the side plate 4'. A magnet-attaching member 10 is rotatably fitted in the annular recess 7a of the inside surface of the magnet holder 7. An outer annular magnet 12 is fitted together with an interposed annular yoke 11 in the magnet-attaching member 10 so that the magnet can be turned together with the magnet-attaching member. An inner annular magnet 13 is secured together with an interposed annular yoke 14 in the magnet holder 7 coaxially with the outer annular magnet 12 so that an annular gap 15 is maintained between the inner and the outer annular magnets. A cup-shaped nonmagnetic electroconductive member 16 is secured as an inductor for the spool 1 to the spool shaft 2 and located in the gap 15 out of contact with the inner and outer annular magnets 13 and 12.

A magnet-turning gear 17 is rotatably fitted on a supporting projection 7b extending from the outside portion of the magnet holder 7 coaxially with the spool shaft 2, so that the magnet-turning gear does not come off. The magnet-turning gear 17 is engaged with the motor shaft gear 6. A pin 19 projecting from the magnet-attaching member 10 is fitted in the engaging hole 18 of the magnet-turning gear 17 so that when the magnet-turning gear is rotated by the motor 5, the outer magnet 12 is turned through the action of the magnet-attaching member 10 to change the polar relation between the outer and the inner magnets 12 and 13 in such a direction as to increase or decrease an eddy current in the non-magnetic electroconductive member 16. The rotation of the spool is thus braked through the action of the nonmagnetic electroconductive member 16 to prevent the backlash of a fishline.

A mark 20 is provided on the surface of the magnet-turning gear 17 so that the mark can be seen from outside through an arc-shaped opening 22 in the side cover 21 secured to the outside of the side plate 4. As a result, the angle of rotation of the magnet-turning gear 17 or the outer magnet 12 can be visually determined from outside of the reel.

Figure 3:
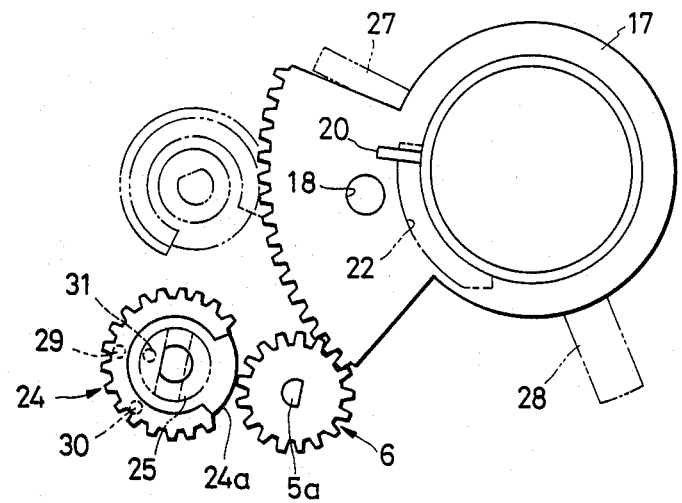
FIG. 3 illustrates the mechanism of FIG. 1 in a mode for automatic prevention of backlash.
Figure 4:
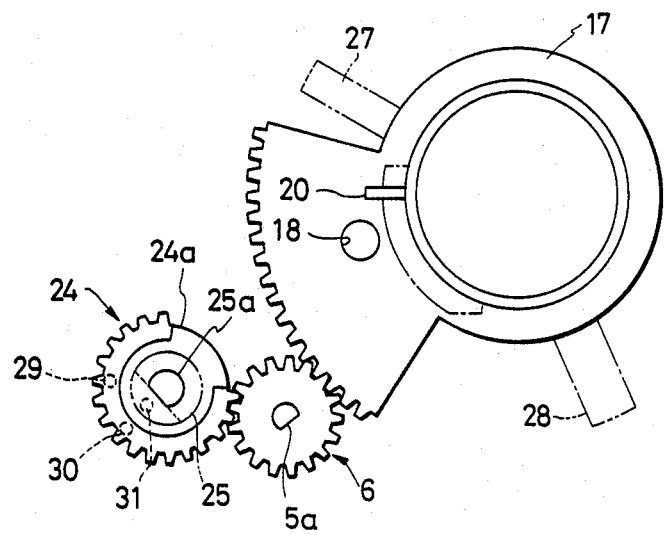
FIG. 4 illustrates the mechanism of FIG. 1 in a mode for manual prevention of backlash.

As shown in FIGS. 3 and 4, an intermittent manual operation gear 24 having a tooth free portion 24a is supported by a shaft 25a of an adjusting lever 25, which extends through a supporting hole 23 of the side cover 21 of the reel body 3. The intermittent manual operation gear 24 can be turned by manipulation of the lever 25 from outside the reel so as to be either engaged with, or disengaged from, the motor shaft gear 6.

When a power supply (battery) is effectively usable for the motor 5, the intermittent manual operation gear 24 is turned so that the tooth-free portion 24a thereof is opposed to the motor shaft gear 6 as shown in FIG. 3. As a result, the intermittent manual operation gear 24 is disengaged from the motor shaft gear 6 so that the backlash of the fishline is automatically prevented through the use of the motor 5.

When the power supply is not effectively usable for the motor 5, the intermittent manual operation gear 24 may be manually engaged with the motor shaft gear 6 as shown in FIG. 4, so that the backlash of the fishline can be manually prevented.

The present invention is not confined to the above-described embodiment, but may be otherwise embodied so that the intermittent manual operation gear 24 is engaged with the magnet-turning gear 17 so as to be capable of being disengaged therefrom, as shown by two-dot chain lines in FIG. 3. In that other embodiment, an appropriate braking force is applied to the shaft 25a of the adjusting lever 25 through the action of a pressure contact member 26 such as an O-ring and a spring at the supporting hole 23 or the like, as shown in FIG. 1, so that the outer magnet 12 is not turned even if a turning force is applied from the motor 5 through the magnet-turning gear 17. As a result, the backlash of the fishline can be manually prevented at a desired time not only when the power supply is not effectively usable but also when it is effectively usable.

The outer magnet 12 may also be secured and the inner magnet 13 may be turned by the magnet-turning gear 17. In that case, the same effect as the above-described embodiment is produced.

Figure 2:
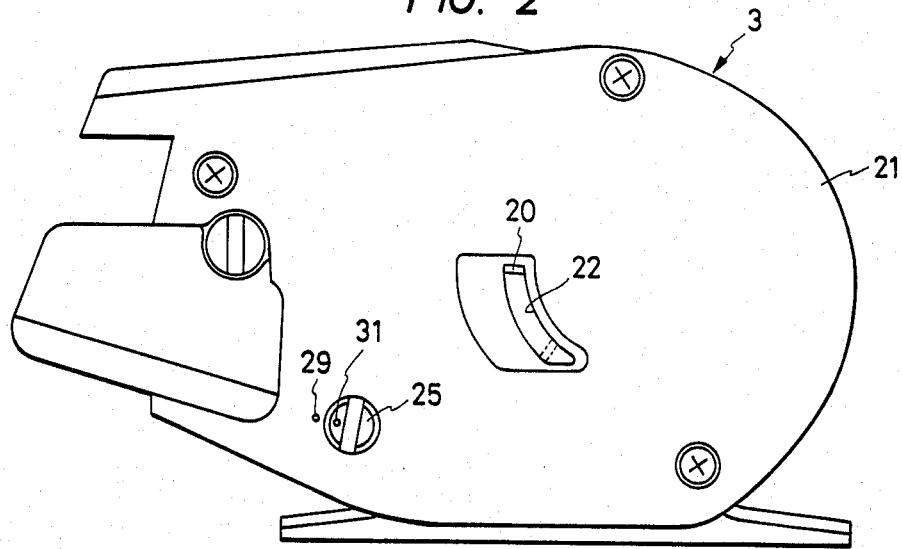
FIG. 2 is a side view of the adjustment mechanism of FIG. 1.

FIGS. 3 and 4 illustrate stoppers 27, 28 for restricting the angle of rotation of the magnet-turning gear 17. The stoppers 27 and 28 are provided on the side plate 4 or the magnet holder 7. An automatic overrotation prevention mark 29 is illustrated in FIG. 2 on the surface of the side cover 21 and located relative to a mark 31 on the adjusting lever 25 so as to indicate that the region for the manual prevention of the backlash of the fishline extends from an upper and a lower position corresponding to angles of about 45 degrees from the position of the automatic prevention mark 29.

Figure 5:
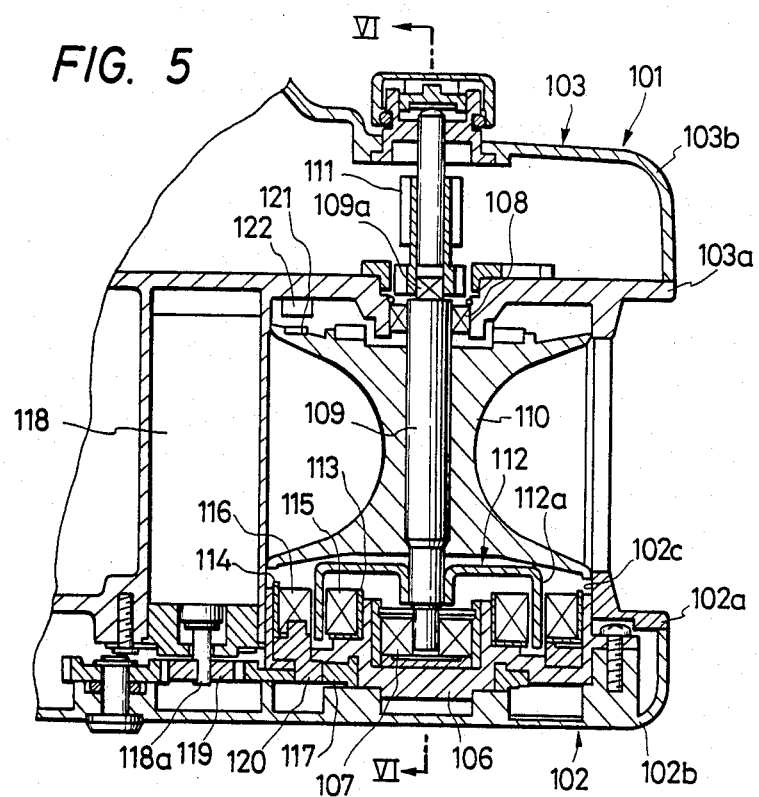
FIG. 5 is a longitudinal sectional view of a second embodiment of the backlash prevention adjustment mechanism of the present invention.
Figure 6:
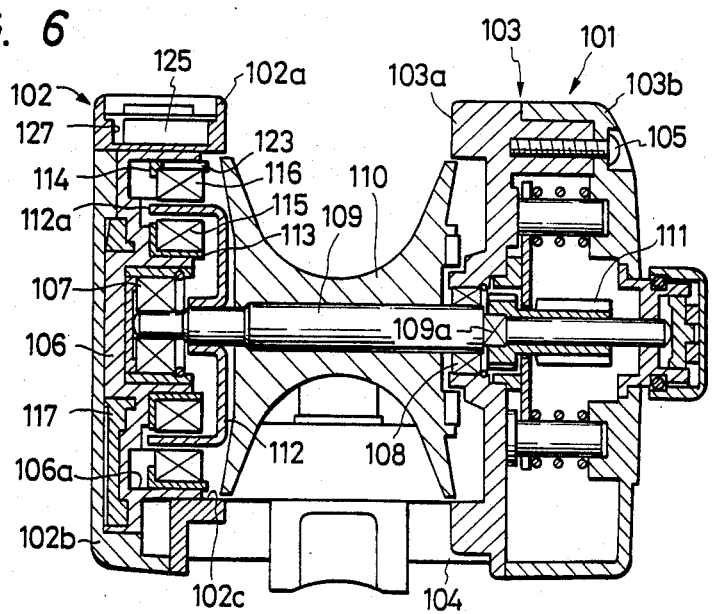
FIG. 6 is a sectional view of the mechanism of FIG. 5 taken along the line VI—VI.

As shown in FIGS. 5 and 6 with respect to a second embodiment of the invention, a body 101 of the fishing reel has right and left side frames 102 and 103 coupled to each other by a transverse bar 104 and located at the prescribed distance from each other. The side frames 102 and 103 comprise side plates 102a and 103a and covers 102b and 103b attached by screws 105. A magnet holder 106 is secured in the side frame 102. A spool shaft 109 is supported by bearings 107 and 108 in the magnet holder 106 and the side plate 103a of the side frame 103 so that a spool 110 is rotatably supported between the side frames 102 and 103.

A pinion 111 is fitted on one end portion of the spool shaft 109 so that the pinion can be slid thereon in the axial direction of the spool shaft. When the pinion 111 is moved in conjunction with the movement of a handle (not shown in the drawings) through a driving gear (not shown in the drawings) and a clutch mechanism (not shown in the drawings) is switched, the pinion is slid back or forth on the spool shaft 109 so as to be engaged with or disengaged from a partially circular portion 109a of the spool shaft to connect or disconnect the spool shaft to or from the handle.

A nonmagnetic electroconductive member 112, which is shaped as a cup, is secured to the other end portion of the spool shaft 109. A peripheral portion 112a of the nonmagnetic electroconductive member 112 extends from a through hole 102c of the side plate 102a into a recess 106a of the magnet holder 106. Magnet rings 115 and 116 are provided on shielding yokes 113 and 114 inside and outside the peripheral portion 112a of the nonmagnetic electroconductive member 112. The inner magnet ring 115 is secured, while the outer magnet ring 116 can be turned together with the shielding yoke 114 in the circumferential direction of the fishing reel.

A magnet-turning gear 117 is rotatably supported by the magnet holder 106 and engaged with a gear 119 provided on the shaft 118a of a motor 118 secured between both the side frames 102 and 103. A magnet-attaching member 120 for the magnet ring 116 is engaged on the magnet-turning gear 117 so that the magnet ring 116 and the shielding yoke 114 are turned together by the motor 118.

A magnet 121 is secured to one end portion of the spool 110. A magnetic sensor 122 for detecting the rotation of the spool 110 by sensing the magnetism of the magnet 121 is secured to the side plate 103a in the face of the zone of rotation of the magnet.

A control means for braking the rotation of the spool 110 by causing an eddy current in the nonmagnetic electroconductive member 112 comprises the magnet rings 115 and 116 and the shielding yokes 113 and 114. In each of the magnet rings 115 and 116, north and south poles are alternately located at prescribed intervals in the circumferential direction of the magnet ring. The nonmagnetic electroconductive member 112 is made of non-magnetic material such as copper and aluminum.

Figure 7:
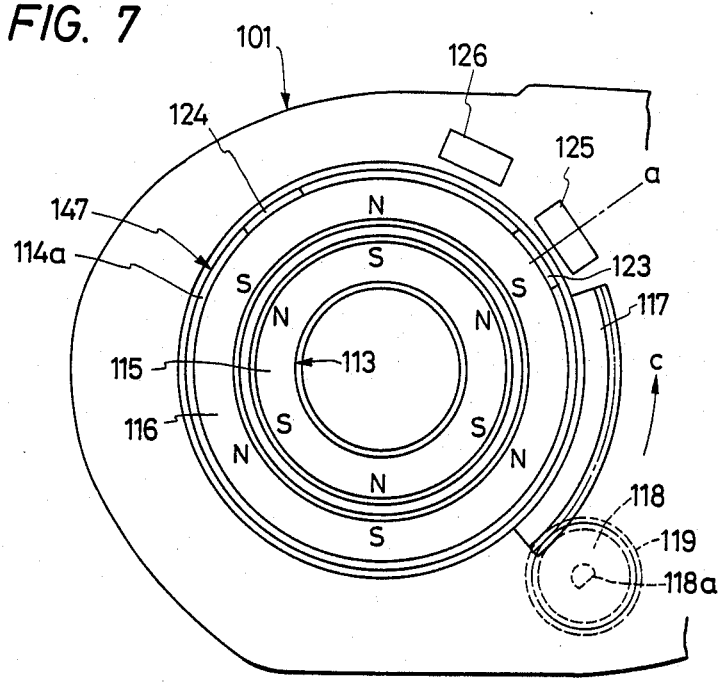
FIG. 7 is an illustration of the mechanism of FIG. 5 in the state for maximum braking force.
Figure 8:
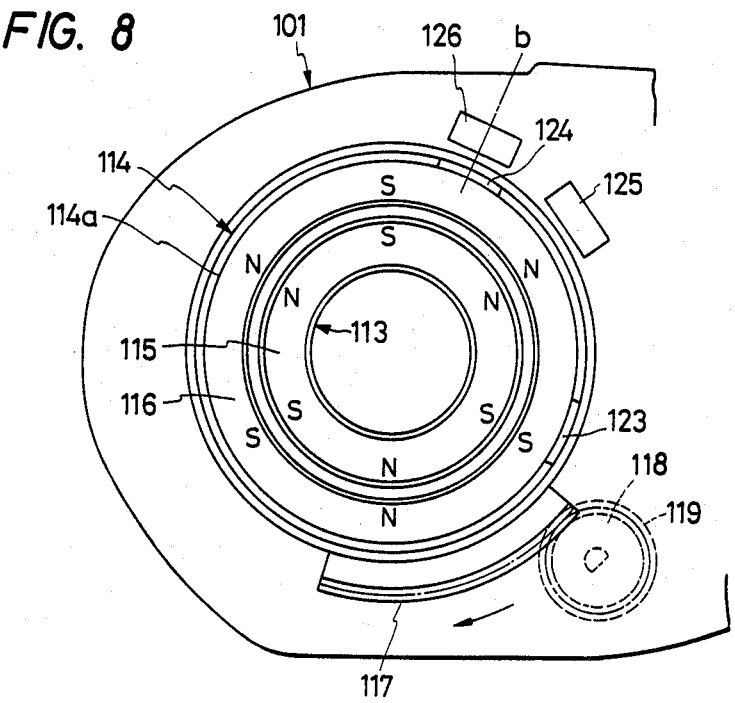
FIG. 8 is an illustration of the mechanism of FIG. 5 in the state for minimum braking force.

A mechanism for detecting the turn limit positions a and b of the magnet ring 116 is now described. The braking force applied to the spool 110 is maximum when the opposite poles of both the magnet rings 115 and 116 are opposed to each other as shown in FIG. 7. The braking force is minimum when the opposite poles of both the magnet rings 115 and 116 are opposed to each other as shown in FIG. 8. Slits 123 and 124 are provided in the peripheral portion 114a of the shielding yoke 114 and located in appropriate positions at an appropriate circumferential interval. Magnetism sensors 125 and 126 are provided in the recess 127 of the side frame 112 so as to be opposed to the slits 123 and 124. As a result, the magnetism of the magnet ring 116 can be sensed by the magnetism sensors 125 and 126 through the sits 123 and 124 to detect that the magnet ring 116 is in the turn limit positions a and b corresponding to the maximum and minimum levels of the braking force, respectively.

When the rotational frequency of the spool 110, which is found out through the detection of the magnet 121 by the magnetism sensor 122, has exceeded a prescribed value, the motor 118 is rotated to turn the magnet ring 116 and the shielding yoke 114 in the direction c shown in FIG. 7 to maximize the braking force on the spool 110. When the slit 123 is then opposed to the magnetism sensor 125, the magnetism of the magnet ring 116 is sensed by the magnetism sensor 125 through the slit 123 which sends an appropriate signal to stop the motor 118.

When the magnet ring 116 and the shielding yoke 114 are turned by the reverse rotation of the motor 118, from the positions (shown in FIG. 7) for the maximum level of the brkaing force, in such a direction as to minimize the braking force and the slit 124 is opposed to the magnetism sensor 126, the magnetism of the magnet ring 116 is sensed by the magnetism sensor 126 through the slit 124 and an appropriate control signal is sent to stop the motor 118.

In a second embodiment of the backlash prevention adjustment device of the present invention magnet rings are provided on shielding yokes inside and outside a nonmagnetic electroconductive member which is rotated in conjunction with the rotation of the spool. One of the magnet rings is turned by the motor to regulate an eddy current caused in the nonmagnetic electroconductive member, to brake the rotation of the spool. The magnetism sensors are provided at the peripheral portion of the turned shielding yoke and located in positions corresponding to those of the turned magnet ring, which correspond to the maximum and minimum levels of the braking force on the spool. The slits for detecting the turned position of the turned magnet ring are provided in the turned shielding yoke to enable the magnetism sensors to sense the magnetism of the turned magnet ring to stop the motor.

Since the constitution of the backlash prevention device is simpler than that of a conventional backlash prevention device in which a motor is controlled by an electric circuit or the like, the backlash prevention device provided in accordance with the present invention can be made more compact to reduce the installation space for the device to decrease the size and weight of the fishing reel. In addition, the backlash prevention device provided in accordance with the present invention can be manufactured at a lower cost.

What is claimed is:

1. A backlash prevention adjustment mechanism for a backlash prevention device comprising:
   a rotatable spool shaft;
   a spool mounted on said spool shaft;

first magnetic means;
second magnetic means;
a nonmagnetic electroconductive member provided between said first magnetic means and said second magnetic means and being rotatable with said rotatable spool shaft for inducing an eddy current in said nonmagnetic electroconductive member to brake the rotation of said spool to prevent backlash of a fishline wound on said spool;
a first gear mechanism for moving said first magnetic means with respect to said second magnetic means to change the level of eddy current induced in said nonmagnetic electroconductive member;
a motor;
a motor shaft gear rotated by said motor and engaged with said first gear mechanism to rotate said first gear mechanism to move said first magnetic means; and
a manual eddy current adjustment means rotatable to a first position disengaged from said motor shaft gear and second position engaged with said motor shaft gear for rotating said first gear mechanism to move said first magnetic means.

2. A backlash prevention adjustment mechanism according to claim 1, wherein said manual eddy current adjustment means comprises:
a manual adjustment gear having a tooth free portion on a first portion thereof and a plurality of gear teeth on a second portion thereof;
a handle for rotating said manual eddy current adjustment means to said second position from said first position to rotate said gear to engage said gear teeth and said motor shaft gear, when a power supply for said motor is not effectively usable.

3. A backlash prevention adjustment mechanic according to claim 1, further including an indicator rotatable with said first gear mechanism to indicate the relative position of said first magnetic means with respect to said second magnetic means.

* * * * *